(12) United States Patent
le Claire et al.

(10) Patent No.: US 6,174,021 B1
(45) Date of Patent: Jan. 16, 2001

(54) WINDBREAK ARRANGEMENT FOR A CABRIOLET

(75) Inventors: Christoph le Claire, Wolfsburg; Hans-Joachim Boy, Gifhorn, both of (DE)

(73) Assignee: Volkswagen AG, Wolfsburg (DE)

( * ) Notice: Under 35 U.S.C. 154(b), the term of this patent shall be extended for 0 days.

(21) Appl. No.: 09/349,542

(22) Filed: Jul. 8, 1999

(30) Foreign Application Priority Data

Jul. 9, 1998 (DE) .............................................. 198 30 699

(51) Int. Cl.⁷ ....................................................... B60H 2/00
(52) U.S. Cl. ...................................... 296/180.5; 296/180.1
(58) Field of Search ............................ 296/180.1, 180.5, 296/85, 37.16

(56) References Cited

U.S. PATENT DOCUMENTS

| | | |
|---|---|---|
| 4,538,852 | 9/1985 | Loto et al. . |
| 4,592,571 * | 6/1986 | Baumann et al. ................. 296/85 X |
| 5,211,718 | 5/1993 | Götz et al. . |
| 5,219,201 | 6/1993 | Götz et al. . |
| 5,318,337 * | 6/1994 | Gotz et al. ........................ 296/180.5 |
| 5,645,311 | 7/1997 | Emmer et al. . |
| 5,702,150 * | 12/1997 | Reuter et al. ..................... 296/180.1 |
| 5,839,774 * | 11/1998 | Hack et al. ....................... 296/180.1 X |

FOREIGN PATENT DOCUMENTS

| | | |
|---|---|---|
| 3821031 | 12/1989 | (DE) . |
| 9303717 | 5/1993 | (DE) . |
| 4320420 | 12/1994 | (DE) . |
| 4325306 | 2/1995 | (DE) . |
| 196 17 702 | 3/1997 | (DE) . |
| 197 08 156 | 3/1998 | (DE) . |
| 197 03 654 | 8/1998 | (DE) . |
| 340796 | 11/1987 | (EP) . |
| 779172 | 6/1997 | (EP) . |

\* cited by examiner

Primary Examiner—D. Glenn Dayoan
Assistant Examiner—Jason Morrow
(74) Attorney, Agent, or Firm—Baker Botts L.L.P.

(57) ABSTRACT

A windbreak arrangement for a cabriolet includes a windbreak arch of bipartite construction in the transverse direction of the vehicle consisting of a first, driver-side windbreak arch member and a second, passenger-side windbreak arch member. The driver-side windbreak arch member is mounted on the driver's seat and the passenger-side windbreak arch member is similarly mounted on the passenger seat. Additionally, each windbreak arch has a curtain cassette with a curtain capable of being extended horizontally as a windbreak curtain over the region behind the corresponding front seat, providing a good variable windbreak function with easy access to rear seats.

5 Claims, 1 Drawing Sheet

WINDBREAK ARRANGEMENT FOR A CABRIOLET

BACKGROUND OF THE INVENTION

This invention relates to windbreaks for cabriolets.

In a cabriolet having an open top, the airstream is directed over the vehicle by the windshield, producing turbulence from behind in the passenger compartment. This leads to an annoying tousling of hair and an unpleasant draft at the back of the neck. Besides, the heat in the passenger compartment is diminished since the resulting motion of the air stirs up and removes the normal cushion of warmth in the passenger compartment. Furthermore, there is a high noise level, especially at higher speeds, preventing or at least interfering with conversation as well as with the audibility of music and also traffic messages.

To mitigate these problems, so-called windbreaks have been provided in the form of framed nettings or roller blinds which are mounted behind the front seats in the region of the passengers' heads.

In the case of smaller, two-seater cabriolets, the rear-body portion or trunk of the vehicle directly adjoins the front seats. In that case, it is sufficient for the suppression of a draft simply to provide a vertical windbreak. For this purpose, German Patent No. 196 17 702 discloses a roll-up windbreak in a cabriolet having a rollover bar which is arranged more or less at the level of the hood located behind the front seats along with an adjacent cover box which is open toward the front. The roll-up windbreak can be extended from below upwardly into a service position and then attached to the transverse member of the rollover bar. For larger cabriolets, especially those with rear seats, such a fixed roll-up system behind the front seat would constitute an undesirable barrier to entry into the rear seats.

European Patent Publication No. 0 340 796 discloses a four-seater cabriolet having a similar roll-up windbreak system located at the floor of the vehicle. Such a roll-up arrangement extending from the floor of the vehicle will also stop an airstream originating at the rear seats from moving toward the front seats. However, since most cabriolets have a domed center tunnel such a roll-up arrangement is available in only the few cabriolet designs which have a flat floor.

In the case of larger cabriolets, in particular four-seaters, to stop an airstream entering the interior of the vehicle from behind downwardly over the back seats, U.S. Pat. No. 5,219,201 discloses a windbreak made in two parts, a vertical part being arranged behind the front seats more or less at head level, and a horizontal part covering the adjacent rear section, at about sill height, in particular over the rear seats.

European Published Application No. 0 779 172, for example, discloses a bipartite windbreak made so that the two parts can be folded together and stowed behind a rear seat backrest. In another known arrangement disclosed in German Gebrauchsmuster No. 93 03 717, a vertical part consisting of a netting stretched in a frame is inserted in holders at the sides of the vehicle. On the underside of the frame, another, flexible netting is attached by one end so that it may be spread over the rear seat area and attached at its posterior edge to the rear seat backrest by hook-and-loop tapes when necessary.

U.S. Pat. No. 5,211,718 describes another embodiment of a windbreak which includes a U-shaped roll-over bar having legs mounted on opposed sides of the vehicle in the region behind the front seats, the cross-bar of the U-shaped roll-over bar passing above the occupants' head level in the transverse direction of the vehicle. In addition, this arrangement includes a roller unit having a wind-up roller extending in the transverse direction of the vehicle near the cross-bar of the U-shaped roll-over bar. The roller is wound with a windbreak which is capable of being rolled up and unrolled, the wind-up roller being spring-loaded in the roll-up direction. When the windbreak is unrolled from the roller into a service position, it covers the area enclosed by the U. In this arrangement, the roller is in the form of a cassette located at the sill level, and the windbreak can be quickly extended from the bottom to the top of the area and hooked to the cross-bar to retain it in the service position. Adjacent to the cassette and connected to it, an additional windbreak part having a frame with netting extends horizontally to the rear. This second posterior windbreak part protects the rear seat area when it is unoccupied.

Four-seater cabriolets, or those having a storage space of some size behind the front seats, are normally two-door vehicles. All of these windbreak embodiments are attached to the vehicle body and, in combination with a horizontal covering of a rear portion of the vehicle, extend over the entire width of the vehicle. Hence, the windbreak disadvantageously creates a barrier at the sill level, barring access to the rear seats, so that the rear seats cannot be used in combination with the windbreak. Hence, nearly all conventional windbreak arrangements are removable, and have a correspondingly expensive construction. There is also the additional problem of stowing a removed windbreak in view of the space limitations of cabriolet.

SUMMARY OF THE INVENTION

Accordingly, it is an object of the present invention to provide a windbreak arrangement for a cabriolet which overcomes disadvantages of the prior art.

Another object of the invention is to provide a windbreak arrangement for a cabriolet in which stowage is simplified and the windbreak function is provided even when the rear seats of the vehicle are occupied.

These and other objects of the invention are attained by providing a windbreak mounted in a windbreak arch which is bipartite in the transverse direction of the vehicle and includes a first driver-side arch and a second passenger-side arch. The driver-side windbreak arch is attached to the driver's seat and, similarly, the passenger-side windbreak arch is attached to the passenger seat.

The windbreak arch used in the preferred embodiment described herein is an ordinary arch having a U-shape, but the term "U-shaped arch" also includes closed-frame arrangements.

By separating the windbreak into two windbreak arches each associated with a corresponding front seat, the adjustability of the front seats independently of each other is fully maintained. In cabriolets, the front seats, or at least the backrests for the front seats, are usually hinged to facilitate access to the rear seats. Connecting each windbreak arch to the backrest of the corresponding seat provides easier access to the rear seats without any hindrance by the windbreak. Also, the windbreak may be advantageously used with its arches in service position even though the rear seats are occupied.

In an especially preferred embodiment of the invention, a windbreak arrangement further comprises a curtain cassette associated with each of the two arches and containing a curtain as a windbreak member which is preferably extendable horizontally over the region behind the front seats and over a rear seat area. These cassettes are likewise attached to the corresponding vehicle seats, preferably in the upper posterior backrest area. Thus, these curtain cassettes, because they are also associated with the corresponding vehicle seats, do not interfere with the use of the rear seats. With a curtain rolled up into the cassette, swinging the corresponding front seat forwardly permits easy access to the rear seat behind it. Also, only one curtain may be rolled out and spread as a windbreak curtain so that, if only one rear seat is occupied, the other rear seat may advantageously be protected by a curtain spread over it.

Preferably, for each seat, one cassette and one associated windbreak arch form a structural unit which is quickly installed or removed.

In another advantageous embodiment two windbreak arches are each pivotable out of a vertical service position into a more or less horizontal stand-by position. Either or both windbreak arches may then be rotated into its service position as required. In the stand-by position, the impression of a cabriolet with no arches is provided.

BRIEF DESCRIPTION OF THE DRAWING

Further objects and advantages of the invention will be apparent from a reading of the following description in conjunction with the accompanying drawings, in which.

DESCRIPTION OF PREFERRED EMBODIMENT

Figure 1:
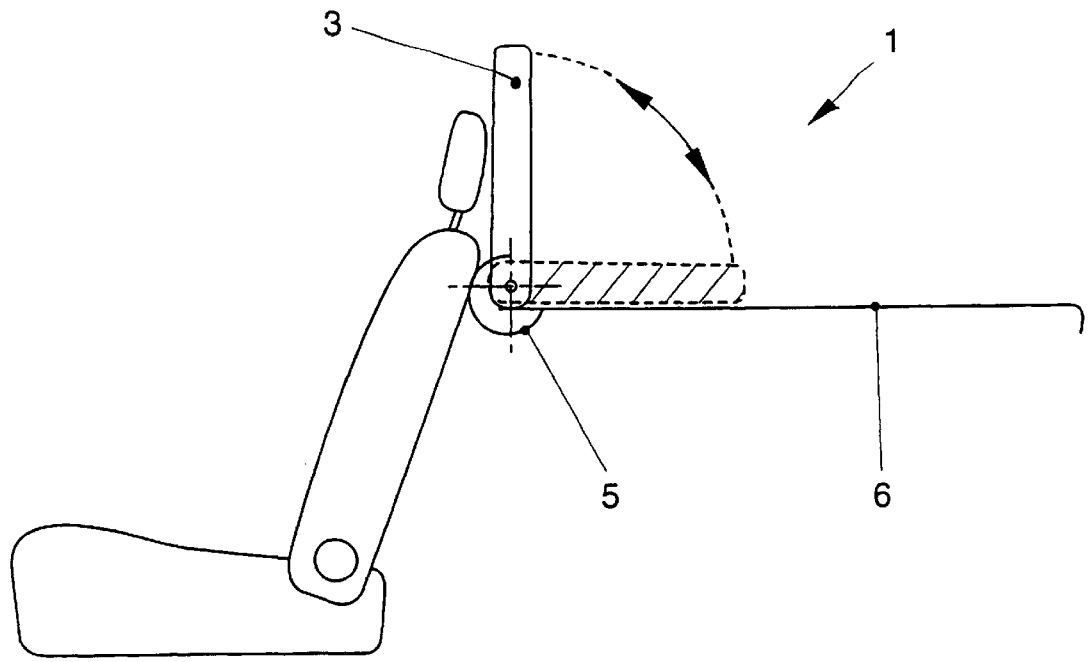
FIG. 1 is a schematic side view illustrating a representative embodiment of a front seat of a cabriolet having a windbreak arrangement according to the invention.

In the typical embodiment of the invention shown in the drawings, a windbreak arrangement 1 for a cabriolet includes a first, driver-side windbreak arch 2 and a second, passenger-side windbreak arch 3, each constituting a windbreak and forming a structural windbreak unit with a corresponding curtain cassette 4 and 5.

These structural windbreak units are mounted on posterior upper backrest regions 7 and 8 of two front seats 9 and 10, the windbreak arches 2 and 3 being swingable from a vertical service position into a horizontal stand-by position (shown in dotted outline). From each of the curtain cassettes 4 and 5, a windbreak curtain 6 may be extended horizontally over the region of a posterior rear seat (not shown).

Figure 2:
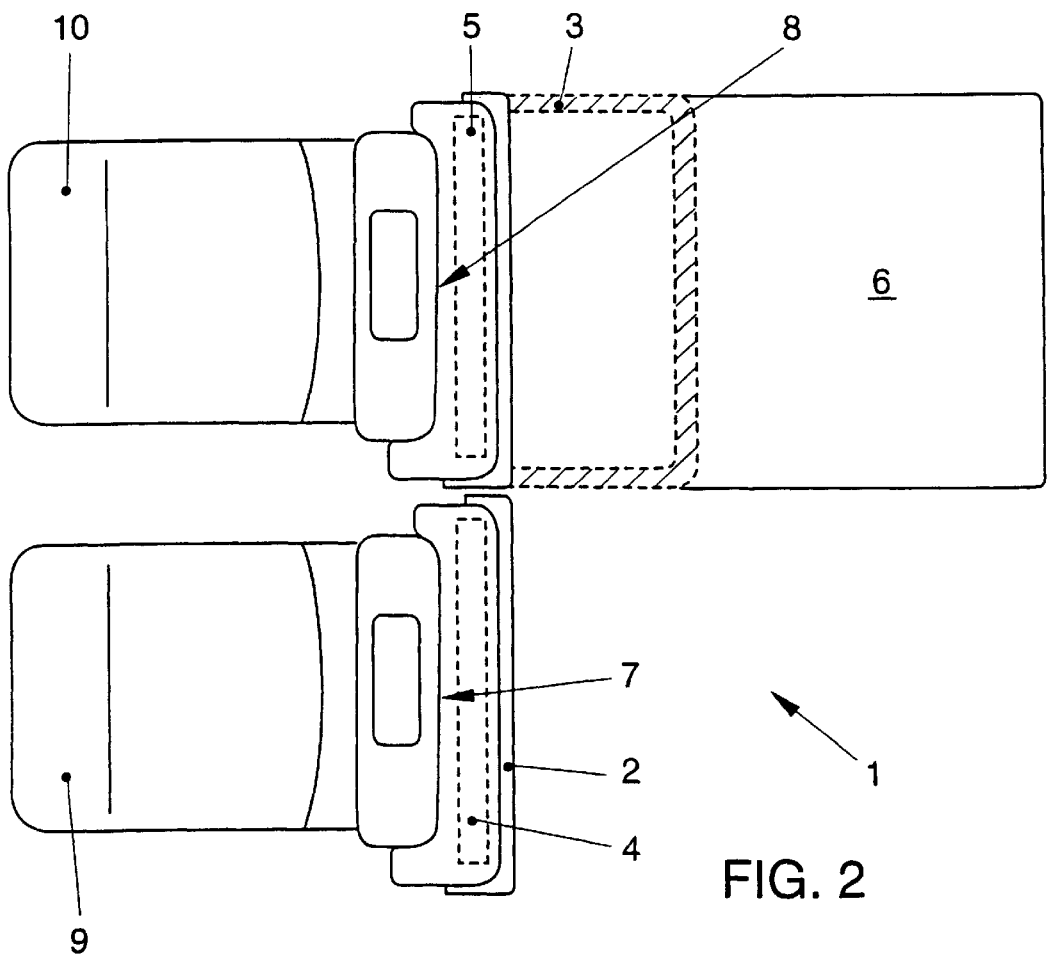
FIG. 2 is a top view showing both front seats of the cabriolet illustrated in FIG. 1.

The windbreak arrangement shown functions as follows. For the vehicle seat 9, as seen in FIG. 2, the windbreak arch 2 is oriented in its vertical service position to provide a windbreak for that seat, and the curtain is rolled up into the cassette 4. Thus, the rear seat behind the front seat 9 is clear for occupancy. To enter that rear seat, the front seat 9 or its backrest 7 may be swung forwardly together with the windbreak structural unit consisting of the windbreak arch 2 and the curtain cassette 4.

The rear seat area behind the front seat 10 which is unoccupied, however, is protected by the horizontally extended windbreak curtain 6 extended from the cassette 5.

Although the invention has been described herein with reference to specific embodiments, many modifications and variations therein will readily occur to those skilled in the art. Accordingly, all such variations and modifications are included within the intended scope of the invention.

We claim:

1. A windbreak arrangement for a cabriolet comprising:

a windbreak unit having a windbreak arch structure which has a windbreak surface extending, in a service position, in a vertical transverse direction of the vehicle from an upper backrest area of the front seats of the vehicle at approximately an occupant's head level and behind any front seat occupant;

wherein the windbreak arch structure includes two independent arch members spaced in the transverse direction of the vehicle including a first, driver-side windbreak arch member and a second, passenger-side windbreak arch member; and wherein the driver-side windbreak arch member is pivotally supported with respect to a vehicle driver's seat and the passenger-side windbreak arch member is separately pivotally supported with respect to a passenger seat.

2. A windbreak arrangement according to claim 1 wherein the two windbreak arch members are fixed to corresponding backrests of the associated vehicle seats and wherein at least a backrest portion of each of the two vehicle front seats is capable of being moved forwardly together with its corresponding windbreak arch member.

3. A windbreak arrangement for a cabriolet comprising:

a windbreak unit having a windbreak arch structure which has a windbreak surface extending in a service position in a vertical transverse direction of the vehicle from an upper backrest area of the front seats of the vehicle at approximately an occupant's head level and behind any front seat occupant, wherein the windbreak arch structure includes two independent arch members spaced in the transverse direction of the vehicle including a first, driver-side windbreak arch member and a second, passenger-side windbreak arch member, wherein the driver-side windbreak arch member is mounted on a vehicle driver's seat and the passenger-side windbreak arch member is mounted on a passenger seat, and a curtain cassette associated with at least one of the windbreak arch members and mounted on the corresponding vehicle seat and having a windbreak curtain extendable horizontally over a region behind the front seats.

4. A windbreak arrangement according to claim 3 wherein the windbreak unit includes a windbreak arch member and an associated curtain cassette mounted in a lower region of the arch member to form a structural unit.

5. A windbreak arrangement according to claim 1 wherein the windbreak arch members are pivotably mounted for motion between a vertical service position and a substantially horizontal stand-by position.

* * * * *